United States Patent [19]
Watanabe

[11] 3,992,016
[45] Nov. 16, 1976

[54] SIMPLIFIED PHONOGRAPH

[75] Inventor: Katsumi Watanabe, Kanagawa, Japan

[73] Assignee: Yugen Kaisha Watanabe Kenkyusho, Japan

[22] Filed: July 8, 1975

[21] Appl. No.: 594,025

[30] Foreign Application Priority Data
Apr. 28, 1975 Japan.................. 50-51885

[52] U.S. Cl.................. 274/1 A; 181/161; 274/33
[51] Int. Cl.².................. G11B 3/02; G10K 13/00; G10K 11/14; A63H 3/33
[58] Field of Search.............. 274/1 A, 33; 181/161, 181/162

[56] References Cited
UNITED STATES PATENTS

| | | | |
|---|---|---|---|
| 2,164,663 | 7/1939 | Ottofr.................. | 274/1 A |
| 3,095,201 | 6/1963 | Ryan.................. | 274/1 A |
| 3,589,735 | 6/1971 | Watanabe.................. | 274/1 A |
| 3,633,923 | 1/1972 | Watanabe.................. | 274/1 A |
| 3,773,331 | 11/1973 | Watanabe.................. | 274/1 A |

*Primary Examiner*—Richard E. Aegerter
*Assistant Examiner*—Steven L. Stephan
*Attorney, Agent, or Firm*—Irving M. Weiner; Pamela S. Austin

[57] ABSTRACT

A phonograph wherein the vibrations set up by a record groove in a reproducing stylus on a tone arm are transmitted, without conversion into electric signals, to a diaphragm overlying the tone arm. Arranged between the tone arm and diaphragm is an intermediate vibrator which has a vibrator rod extending upwardly therefrom. The diaphragm is conical in shape, is secured to the phonograph casing at the periphery of its base, and has an aperture at its vertex to receive the vibrator rod with clearance. The intermediate vibrator is spring biased into contact with the tone arm, and the vibrator rod also spring biased into contact with the edge of the diaphragm bounding the aperture. This aperture can be reinforced with a hollow member which will receive the vibrator rod with clearance.

5 Claims, 6 Drawing Figures

SIMPLIFIED PHONOGRAPH

BACKGROUND OF THE INVENTION

This invention relates to sound-reproducing devices, to phonographs, and to a simplified phonograph wherein the vibrations of a stylus tracking a spiral groove on a rotating record disc are directly reproduced by a diaphragm as audible vibrations of the air. The simplified phonograph according to the invention finds typical use as a toy or in conjunction with various toys.

In conventional phonographs of the type and class now under consideration, an intermediate vibrator member is arranged between a conical diaphragm and a pivotal tone arm carrying a reproducing stylus. A turntable for placing a record disc thereon is mounted on the inside of an openable lid at the bottom of the phonograph casing. Thus, upon closure of the lid, the stylus will ride in the groove on the record disc on the turntable, with the consequent exertion of pressure on the diaphragm from the turntable via the record, stylus, tone arm, and intermediate vibrator member.

In the foregoing prior art configuration the relative placement of the diaphragm, intermediate member, tone arm, stylus, turntable and so forth must be so precise that the service lives of the diaphragm, stylus and record, in particular, will not be unduly shortened through application of excessive pressure. However, in the phonographs of this class, such precise relative placement of the listed members is both difficult and impractical in view of the costs involved and of the materials in use.

Special attention should be paid to the diaphragm, which easily suffers strain, and hence causes deterioration in the quality of the sound reproduced, when subjected to any undue stress from the intermediate member in contact therewith. It is nevertheless essential for sound reproduction with sufficient volume that the intermediate member be held in contact with the diaphragm under proper pressure. In view of such conflicting requirements the diaphragm has heretofore been resiliently mounted by use of springs, but even then the diaphragm is bound to deform when subjected to forces which cannot be absorbed by the springs.

The prior art phonographs have a further drawback in that the sound reproduced thereby tends to be unnecessarily high-pitched This drawback, as has now been discovered, is a direct result of the resilient mounting of the diaphragm. It has also been found that the structural complexity of the prior art phonographs is a cause of various trouble including the production of poor quality sound through improper vibration of the diaphragm.

SUMMARY OF THE INVENTION

In view of the listed deficiencies of the prior art it is an object of this invention to provide a phonograph of extremely simplified construction which includes an intermediate vibrator arranged between a tone arm and diaphragm to transmit the vibrations of a stylus to the diaphragm, in such a manner that the diaphragm is absolutely free from the possibility of deformation but is nevertheless highly responsive to the vibrations of the stylus.

Another object of the invention is to improve the quality of the sound reproduced by the phonograph of the character defined.

A further object of the invention is to protect not only the diaphragm but also the stylus, record disc and other parts of the phonograph from any excessive pressure and hence to prolong their service lives.

A further object of the invention is to provide a phonograph wherein a pivotal tone arm carrying the stylus on its free end can be automatically returned, upon completion of each playback operation, to a predetermined starting position on the record disc by extremely simple means.

A further object of the invention is to provide a phonograph wherein an endless belt of elastic material is employed both for driving a turntable rotatably mounted on the inside of a hinged lid and for making the lid self-closing, thereby contributing significantly toward the simplification of the overall construction.

A still further object of this invention is to provide a phonograph wherein the intermediate vibrator is spring biased into contact with the tone arm in such a manner that the turntable will rotate at a constant speed throughout the course of playback operation.

Summarized in its perhaps broadest aspects, this invention provides, in a simplified phonograph of the type described, the combination including an intermediate vibrator which overlies the tone arm and which includes a portion extending along a predetermined path of travel of the stylus carrying end of the tone arm over the record disc on the turntable. The intermediate vibrator is spring biased into contact with the tone arm to receive vibrations of the stylus therethrough. A vibrator rod extends upwardly from the intermediate vibrator and is received with clearance in an aperture formed at the vertex of a conical diaphragm. The vibrator rod is also spring biased into contact with the edge of the diaphragm bounding the aperture, in such a way that the vibrator rod is movable in its longitudinal direction in sliding contact with the diaphragm.

In the preferred form of the simplified phonograph hereinafter disclosed, the diaphragm is secured to the phonograph casing at the periphery of its base, instead of being resiliently mounted as in the prior art. This arrangement has proved to be highly effective to damp the unpleasantly high portion of the total audio frequency vibrations that would otherwise be caused in the diaphragm, resulting in substantial improvement in the quality of the sound reproduced.

The features which are believed to be novel and characteristic of this invention are set forth in particular in the appended claims. The invention itself, however, both as to its organization and mode of operation, together with the additional objects and advantages thereof, will become apparent in the course of the following description read in connection with the accompanying drawings in which like reference characters refer to the corresponding parts of the several views.

DESCRIPTION OF THE PREFERRED EMBODIMENTS

Figure 1:
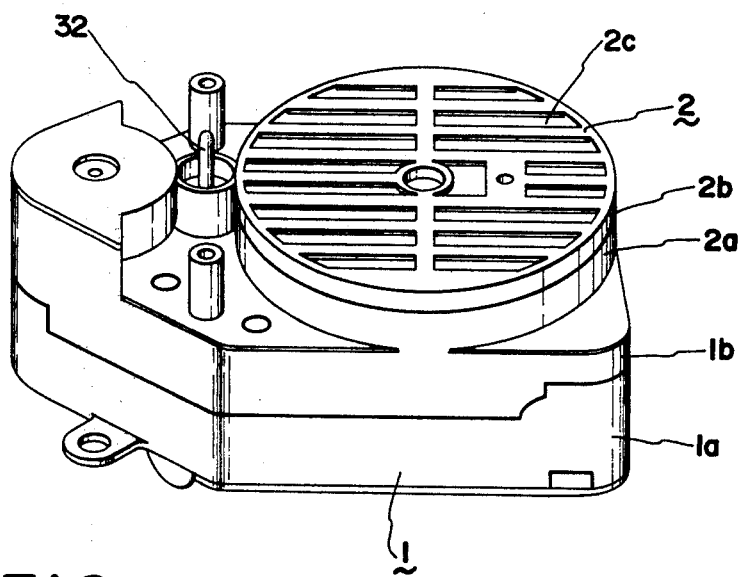
FIG. 1 is a perspective view of a simplified phonograph constructed in accordance with the novel concepts of this invention.

FIG. 1 of the drawings is directed to the external appearance of a preferred form of the simplified phonograph according to this invention. The illustrated phonograph includes a casing 1 which may be conveniently molded of plastics material. This casing comprises bottom and top sections 1a and 1b rigidly connected to each other, and a loudspeaker jacket 2 formed over the top section 1b. The loudspeaker jacket 2 consists of a hollow, cylindrical portion 2a molded integral with the top casing section 1b and a cap 2b closing the top end of the cylindrical portion.

Figure 2:
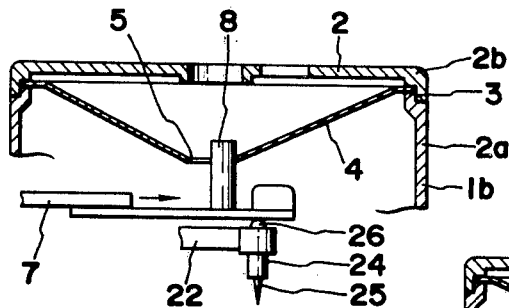
FIGS. 2, 3 and 4 are fragmentary, vertical sectional views showing some possible examples of a diaphragm for use in the phonograph of FIG. 1.
Figure 3:
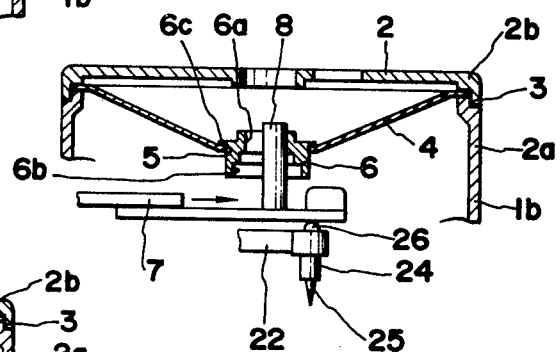
Figure 4:
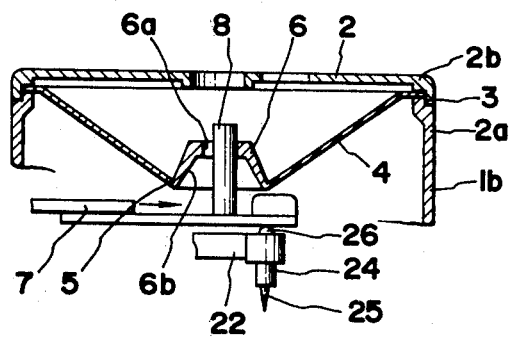

As will be seen from FIG. 2, 3, 4 or 6, the cap 2b may be screw-threadly affixed at 3 to the cylindrical portion 2a. The cap 2b has an array of slots 2c or like apertures to permit transmission therethrough of the sound waves generated by a diaphragm 4. Conical or funneled in shape, the diaphragm 4 has a marginal edge formed along the periphery of its top end or base. This marginal edge is tightly gripped between the opposed edges of the cylindrical portion 2a and cap 2b of the loudspeaker jacket 2, preferably with the aid of an adhesive. The diaphragm is thus relatively securely supported in position within the loudspeaker jacket 2. FIGS. 2, 3 and 4 illustrate some different practical forms of the diaphragm according to this invention, as will be later explained in detail.

Figure 5:
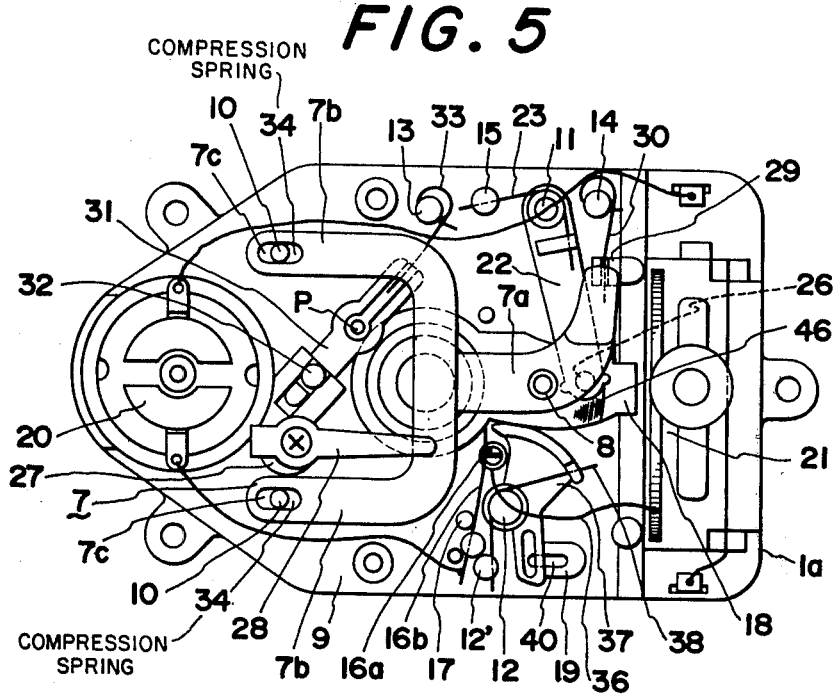
FIG. 5 is a top plan view showing the phonograph of FIG. 1 with its top casing section removed.
Figure 6:
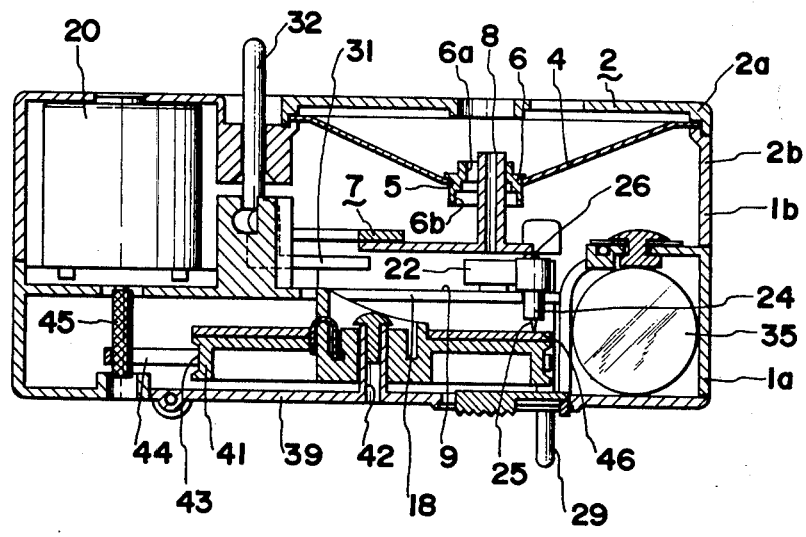
FIG. 6 is a vertical sectional view of the phonograph of FIG. 1, in which there is incorporated the diaphragm of FIG. 3 by way of example only.

FIGS. 5 and 6 illustrate the internal details of the phonograph in which there is incorporated the diaphragm of FIG. 3 by way of example. The bottom section 1a of the casing 1 has a platform 9 molded integral therewith, and a tone arm 22 is pivotally supported at 11 on the platform 9. Arranged at the other free end of the tone arm is a pickup 24 which can be either molded integral with the tone arm or rigidly connected thereto. A reproducing stylus 25 extends downwardly from the pickup 24 through an aperture 18 formed in the platform 9, into contact with the spiral groove on a conventional record disc 46 that is manufactured specifically for use with this type of phonograph. The tone arm 22 has a hemispherical projection 26 formed on its top in vertical register with the stylus 25.

An intermediate vibrator 7 is arranged between the tone arm 22 and diaphragm 4 for transmission therethrough of the vibrations from the former to the latter. The intermediate vibrator 7 comprises a contact portion 7a extending along the path of travel of the free end of the tone arm 22 for direct contact with its projection 26, and a U-shaped support portion 7b which is rigidly connected to the contact portion as shown.

The support portion 7b of the intermediate vibrator has slots 7c at its ends remote from the contact portion 7a to loosely receive respective pins 10 extending upwardly from the platform 9, in such a manner that the intermediate vibrator is movable to and fro within limits in a plane parallel to the platform besides being pivotable about the pins 10 toward and away from the platform.

A leaf spring 28 is mounted on a projection 27 on the platform 9 to bias the intermediate vibrator 7 toward the platform and to prevent the same from detachment from the pins 10. The stylus 25 is thus urged under suitable pressure against the record disc 46 via the tone arm 22 and pickup 24. A pair of helical compression springs are installed at 34 between the intermediate vibrator 7 and pins 10 to bias the former toward the right, as viewed in FIG. 5 or 6, for purposes hereinafter made apparent.

The intermediate vibrator 7 integrally comprises a vibrator rod or pin 8 extending upwardly from its contact portion 7a to impart the vibrations of the stylus 25 to the diaphragm 4.

In the preferred embodiment of the invention shown in FIGS. 3 and 6, the vibrator rod 8 is received with clearance in a reinforcing member 6 of hollow, substantially cylindrical shape which is securely fitted in an aperture 5 formed at the bottom end or vertex of the conical diaphragm 4. The diaphragm itself may be made of any suitable material including plastics, and the reinforcing member 6 is in one form of construction molded of plastics and is bonded to the diaphragm.

The particular reinforcing member 6 of FIGS. 3 and 6 is flanged at 6c to engage the diaphragm at its edge bounding the aperture 5. The reinforcing member has a hollow of stepped configuration extending vertically therethrough, the hollow being significantly more reduced in diameter at its top end 6a than at the bottom end 6b. The reinforcing member is therefore held in internal contact with the vibrator rod 8 at its top end portion as the latter is yieldably urged in the direction of the arrow in FIG. 3 by the compression springs 34 of FIG. 5. It should be noted that the vibrator rod 8 thus received with clearance in the reinforcing member 6 is movable in its longitudinal direction in sliding contact with the reinforcing member to prevent deformation of the diaphragm 4.

FIG. 4 illustrates a slight modification of the reinforcing member 6. This modified reinforcing member is frustoconical in shape and is bonded to the diaphragm 4 at its bottom edge. The hollow extending vertically through the modified reinforcing member 6 is also significantly more reduced in diameter at its top end 6a than at the bottom end 6b, so that the vibrator rod 8 is yieldably urged into contact with the reinforcing member at its top end 6a.

As may now be apparent, the vibrator rod 8 should be in contact with the reinforcing member 6 at a region away from the region where the reinforcing member is secured to the diaphragm 4 and should be relatively movable in its longitudinal direction. Furthermore, for most effective vibration of the diaphragm 4, the contacting surfaces of the vibrator rod 8 and reinforcing member 6 should be roughened or made irregular.

It is to be clearly noted, however, that the provision of the reinforcing member 6 is not of absolute necessity. Instead, as shown in FIG. 2, the vibrator rod 8 can be inserted directly into the aperture 5 at the vertex of the diaphragm 4. The edge of the diaphragm bounding this aperture should preferably be coated with a suitable resin or the like by way of reinforcement. The vibrator rod 8 is of course biased by the compression springs 34, FIG. 5, in the arrow marked direction into contact with the diaphragm 4. The contacting surfaces of the vibrator rod 8 and diaphragm 4 should also be roughened or made irregular to cause the diaphragm to vibrate most effectively.

With reference again to FIGS. 5 and 6, a torsion spring 23 wound on the pivot 11 of the tone arm 22 has one of its ends engaged by a spring retainer 15 on the platform 9 and the other end by the tone arm to cause the latter to return to a predetermined starting position on the record disc 46 upon completion of each playback operation. The tone arm 22 is supported by the pivot 11 so as to be swingable not only in a plane parallel to the platform 9 but in the direction perpendicular thereto through a slight angle.

Shown at 29 is a push rod arranged uprightly under the contact portion 7a of the intermediate vibrator 7 and partly projecting out of the bottom of the casing 1. A spring 30 is mounted on a retainer 14 on the platform 9 to bias the push rod 29 downwardly. Thus, upon manual depression of the push rod 29 projecting out of the casing 1 against the bias of the spring 30, the intermediate vibrator 7 will be raised out of contact with the tone arm 22 against the influence of the leaf spring 28.

A lever 31 is pivotally supported at P in the seesaw fashion on the platform 9. Pivotally mounted on one end of this lever 31 is a second push rod 32 which projects upwardly through the top of the casing 1, as shown in FIGS. 1 and 6. The other end of the lever 31 extends under the intermediate vibrator 7 and is biased toward the platform 9 by a spring 33 mounted on a spring retainer 13. Therefore, upon manual depression of the second push rod 32 against the bias of the spring 33, the said other end of the lever 31 will swing upwardly about the pivot P to raise the intermediate vibrator 7 out of contact with the tone arm 22 against the force of the leaf spring 28.

In FIG. 6 there is shown an electric motor 20 for driving a turntable 41 rotatably mounted on an upright shaft 42 on the bottom of the casing 1. A pair of conductors 36 connect the drive motor 20 to a power supply 35, which in practice may take the form of a dry cell, via a variable resistor 21. One of the conductors is provided with a switch comprising a fixed contact 16a and movable contact 16b, the fixed contact being connected to the variable resistor 21 and the movable contact to the drive motor 20.

The movable contact 16b is in the form of a resilient piece of wire and is normally urged by a projection 17 on the platform 9 into contact with the fixed contact 16a. The free end of the movable contact 16b extends over the aperture 18 in the platform 9 so as to be tripped by the tone arm 22 as the latter moves close to the center of the record disc 46 on the turntable 41 at the end of each playback operation, as will be later described in more detail.

A switch actuator 37 is pivotally supported at 12 for swinging movement along the platform 9. A torsion spring 38 has one of its ends engaged by a spring retainer 12' on the platform 9 and the other end by the switch actuator 37, so that the latter is yieldably urged to turn counterclockwise, as seen in FIG. 5, to separate the movable contact 16b from the fixed contact 16a.

Normally, however, the switch actuator 37 is held in the position of FIG. 5 by a stop 40 extending upwardly from a hinged lid 39, FIG. 6, at the bottom of the casing 1. The stop 40 has a sloping edge at its top end portion which, when the lid 39 is closed, projects out of an opening 19 in the platform 9 for engaging contact with the switch actuator 37. The drive motor 20 can therefore be electrically connected to the power supply 35 upon closure of the lid 39.

It will be noted from FIG. 6 that the shaft 42 rotatably supporting the turntable 41 thereon is formed integral with the lid 39. An endless belt 44 extends around the grooved rim 43 of the turntable 41 and the knurled output shaft 45 of the drive motor 20. The turntable can thus be set in rotation immediately when the drive motor becomes electrically connected to the power supply 35.

The endless belt 44 should be made of rubber or like elastic material so that the lid 39 may be opened with the belt installed in position. In this manner the lid will automatically return to the illustrated closed position by virtue of the elasticity of the belt when released after being opened as for installation of the record disc 46 or replacement of the dry cell 35.

In operation, the record disc 46 may be placed upon the turntable 41 while the lid 39 is opened. The lid will automatically swing to its closed position when released succeedingly, whereupon the record disc 46 will be pressed against the reproducing stylus 25 to engage the same in its groove. It is understood that the tone arm 22 is now located in its predetermined starting position on the record disc by the action of the torsion spring 23. As the pressure is exerted on the stylus 25 from the record disc 46 as aforesaid, the intermediate vibrator 7 will be pressed toward the diaphragm 4 via the pickup 24 and tone arm 22. Since, however, the the vibrator rod 8 on the intermediate vibrator 7 slidably extends through the aperture 5 in the diaphragm 4, or through the reinforcing member 6 fitted in the aperture 5, the diaphragm is now subject to no pressure from the intermediate vibrator.

Upon closure of the lid 39 the stop 40 projects upwardly through the opening 19 in the platform 9 to cause the switch actuator 37 to turn clockwise, as viewed in FIG. 5, against the force of the torsion spring 38 and hence to permit the movable contact 16b to move into touch with the fixed contact 16a. With the drive motor thus set in operation the rotation of its output shaft 45 is imparted to the turntable 41 and record disc 46 thereon via the endless belt 44.

The vibrations set up in the stylus 25 during rotation of the record disc 46 are transmitted to the diaphragm 4 via the pick-up 24, tone arm 22, and intermediate vibrator 7 with its vibrator rod 8. The diaphragm, of course, vibrates in step with the stylus vibrations and transmits such vibrations to the air as sound waves through the loudspeaker jacket 2. It has been confirmed that the highly effective vibration of the diaphragm 4, resulting in the projection of sound of sufficient volume, becomes possible if the diaphragm is provided with the reinforcing member 6 as in FIGS. 3 and 4 and if the reinforcing member is in internal contact with the vibrator rod 8 at a region away from the region where the member is secured to the diaphragm.

As the rotation of the record disc 46 proceeds, the tone arm 22 swivels clockwise, as seen in FIG. 5, about the pivot 11, with its hemispherical projection 26 in sliding contact with the contact portion 7a of the intermediate vibrator. When the stylus carrying end of the tone arm 22 moves sufficiently close to the center of the record disc on the turntable 41, it engages the free end of the movable contact 16b to separate the same from the fixed contact 16a. The drive motor 20 is therefore automatically disconnected from the power supply upon completion of each playback operation. The on-off control of the drive motor is thus performed by a single switch comprising the fixed contact 16a and movable contact 16b. This is preferable to the provision of several switches because they might have an adverse effect on the performance characteristics of the drive motor.

The push rod 29 or 32 may now be depressed against the force of the spring 30 or 33 to raise the intermediate vibrator 7 out of contact with the projection 26 on the tone arm 22 against the force of the spring 28. The tone arm will then return to the illustrated starting position on the record 46 under the influence of the torsion spring 23, and the stylus 25 will again ride in the groove on the record as the push rod 29 or 32 is released succeedingly. It is particularly noteworthy that the tone arm can be returned to the starting position through this simple procedure thanks to the fact that the intermediate vibrator 7 has its rod 8 slidably extending upwardly through the aperture 5 or reinforcing member 6 of the diaphragm 4.

Phonographs of this class and kind are usually not equipped with a governor for automatic control of the speed of turntable rotation, so that the turntable tends to increase in its speed of rotation as the stylus moves closer to the center of the record disc thereon during playback operation. This deficiency, however, is absent from the simplified phonograph according to this invention, for the following reasons.

The intermediate vibrator 7 overlying the tone arm 22 is pivotally mounted on the pins 10 that are located at the extreme ends of the vibrator in the direction of travel of the stylus 25 during playback operation. The intermediate vibrator, moreover, is yieldably urged against the tone arm by the lead spring 28 which exerts pressure thereon at a point adjacent the center of the record disc 46 on the turntable 41. Thus, as the stylus moves closer to the center of the record disc during playback operation, the intermediate vibrator will exert increasing pressure on the tone arm thereby compensating for the decrease in the resistance offered by the tone arm itself to the rotation of the record disc. It is possible in this manner to afford record rotation at constant speed throughout the course of playback operation.

Although the simplified phonograph according to this invention has been shown and described hereinbefore in terms of its preferred form, it is understood that the invention itself is not to be restricted by the exact details of this disclosure but is inclusive of numerous modifications which will occur to the specialists without departing from the scope of the following claims.

What is claimed is:

1. In a simplified phonograph of the type comprising a turntable for placing a record disc thereon, drive means for imparting rotation to the turntable, and a tone arm pivotally supported at one end and having a reproducing stylus at the other end which rides in a groove on the record disc on the turntable, the combination thereof with:
   an intermediate vibrator overlying said tone arm, said intermediate vibrator including a portion extending along a predetermined path of travel of said other end of said tone arm over the record disc on said turntable said intermediate vibrator being mounted for movement in a first direction perpendicular to said record and in a second direction perpendicular to said first direction;
   first spring means for yieldably urging said intermediate vibrator in said first direction against said tone arm;
   a vibrator rod extending upwardly from said intermediate vibrator in said first direction;
   a diaphragm arranged over said intermediate vibrator, said diaphragm being conical in shape and having at its vertex an aperture adapted to receive said vibrator rod with clearance; and
   second spring means for yieldably urging said vibrator rod in said second direction against the edge of said diaphragm bounding said aperture while permitting said vibrator rod to move in its longitudinal direction in sliding contact with said edge of said diaphragm.

2. The combination of claim 1 wherein the contacting surfaces of said vibrator rod and said edge of said diaphragm are roughened.

3. The combination of claim 1 including a reinforcing member securely fitted in said aperture in said diaphragm, said reinforcing member having a hollow therethrough for receiving said vibrator rod with clearance, said vibrator rod being yieldably urged by said second spring means against the internal surface of said reinforcing member defining said hollow.

4. The combination of claim 3 wherein the contacting surfaces of said vibrator rod and said reinforcing member are roughened.

5. The combination of claim 3 wherein said hollow of said reinforcing member has a reduced diameter portion at which said reinforcing member is in internal contact with said vibrator rod, said reduced diameter portion being located off a region where the opposite end of the reduced diameter portion of said reinforcing member is secured to said diaphragm.

* * * * *